United States Patent [19]

Schmitz

[11] 3,932,748

[45] Jan. 13, 1976

[54] METHOD OF DETERMINING THE DISTANCE BETWEEN AREA UNDER FIRE AND THE MUZZLE OF THE WEAPON

[75] Inventor: Jürgen Schmitz, Leopoldshafen, Germany

[73] Assignee: Gesellschaft für Kernforschung m.b.H., Karlsruhe, Germany

[22] Filed: Mar. 25, 1974

[21] Appl. No.: 454,556

[30] Foreign Application Priority Data
Mar. 24, 1973 Germany............................ 2314755

[52] U.S. Cl. .................. 250/303; 73/167; 250/395
[51] Int. Cl.² ......................................... G21H 5/02
[58] Field of Search ........... 250/271, 302, 303, 304, 250/390, 392, 234, 395; 73/167

[56] References Cited
UNITED STATES PATENTS
3,766,778   10/1973   Henrichsen .................... 250/234 X OTHER PUBLICATIONS
"Analysis by Neutrons Aids Crime Solution," The Washington Post, Feb. 24, 1962.

Primary Examiner—Davis L. Willis
Attorney, Agent, or Firm—Spencer & Kaye

[57]   ABSTRACT

Method of determining the distance between an area under fire and the muzzle of the weapon by means of autoradiography of the irradiated firing residues on this area. Several carrier areas are fired at from various distances. The carrier areas are subsequently activated by neutron irradiation and subsequently contacted with a film sensitive to nuclear radiation. The series of autoradiographs produced after development on the film are compared with the autoradiograph, produced in the same way, of the firing trace to be investigated on the area fired at and used as a distance standard for that trace.

5 Claims, 2 Drawing Figures

The method proposed in the present invention is outlined below on the basis of its various steps:

Preparation of Shooting Test Samples

The material used for shooting was selected from among various grades of filter paper for tests of the procedure. One of the main criteria of selection was a low barium and antimony content, but also that sulfur and phosphorus should cause only minimum matrix effects. The trial shots were then fired at the filter paper and at colorless cotton twill to optimize the stripping technique. A series of shots were fired at distances ranging from 5 to 200 cm. The weapon used was caliber 0.22. The bullets were unsheathed lead ammunition. The weapon was cleaned after each shot. The impact areas with the shot impacts were punched with a stencil, concentrically around the impact hole. The scraper ring of the bullet was not removed.

Activation

Several test shot specimens individually packed in polyethylene bags were irradiated in polystyrene tanks in the thermal column of a nuclear reactor of the FR 2 type. The neutron flux was $2 \times 10^{11}$ cm$^{-2}$sec$^{-1}$, the in-pile time amounted to 7 days. Under these conditions the temperature does not rise above 80°C, and there is practically no flux gradient. The paper and cloth samples do not change in color, elasticity and strength.

Because of the sodium content of the samples irradiation was followed by a decay of approximately 10 days until the autoradiographs were made and the gamma activity was counted. Thee analysis was specifically tuned to the long lived antimony 124 (halflife 60 days). In this way it is not necessary to rush the analytical measures and there is ample time to carry out series of exposures and measurements.

Preparation of Autoradiographs

After variation of the different parameters, i.e., type of film, developer, exposure time and contact pressure of the activated samples, the following pattern was developed for the method according to the present invention resulting in the most advantageous ratio between background and density:

Activation: Integral n-flux approximately $10^{-7}$ cm$^{-2}$
Decay period: approximately 10 days
Film material: Curix RP 1 clear base
Exposure time: approximately 10 hours
Contact pressure: approximately 25 g/cm$^2$
Developer: Tenetal Eukobrom paper developer at a maximum temperature of 20°C, developing time 5 min.

Exposure is made with an intermediate foil of 50 $\mu$ of polyethylene to avoid chemigraphy of the films. The contact pressure is sufficiently high for optimum contact between the material under fire and the film material. Higher pressures might result in damage and hence falsify the density of the film emulsion.

Ten shooting samples each are simultaneously exposed on a special plate and afterwards subjected to the same chemical treatment of tank development in a common holder.

Since in practice the samples of cloth and the carriers made of different materials, respectively, exhibit different matrix activities, it is necessary and very important to separate the matrix from the trace of the bullet. Especially polyester material and other mixed fabrics contain major amounts of antimony as a catalyst. Detergents and finishers contain sulfur and phosphorus which are also activated to a long halflife during neutron irradiation. Hence, a reproducible separation must be made also for the gamma count.

In this new method according to the present invention approximately 50% of the residue after activation can be transferred to an inactive carrier.

A hydraulic press is used to establish the contact between the cloth specimen and an adhesive foil for a period of 1 min. under a contact pressure of approximately 50 kg/cm$^2$. Then the two layers are slowly separated under an angle of 180°. The strip is covered with a polyethylene foil of 50 $\mu$ on the adhesive side and stored under slight pressure until the autoradiographs are made. The adhesive foil used is a commercial type of book foil. The data indicated apply to a firm smooth carrier material and may be different depending on the type of fabric. However, the stripping technique may be performed also prior to neutron activation in order to transfer the characteristic pattern of traces also of immovable objects. A suitable type of carrier material is high purity polyethylene foil which should be equipped with an adhesive containing no heavy metals.

Activity Measurement

The activity was measured non-destructively by means of solid state detectors. The gamma spectra are evaluated by a computer. The 0.603 MeV line of antimony-124 was used for evaluation. At ranges of 200 cm the measuring time ran up to 30 min., the activity of the scraper rings and the carrier materials was subtracted. The gamma spectrum of the traces of the shot merely showed the desired antimony-122/124 activity and a small fraction of barium-131.

Total Density and Number of Particles

The total density of the autoradiographs and the number of particles were measured by means of an electronic image analyzer. A specially designed illuminated table transmits the autoradiograph onto a monitor by means of an image tube. The sensitized image area is converted into pulse counts by means of an electronic scan. Care had to be taken to keep the mask area and the setting of intermediate shades constant over the entire series of measurements, both for a weakly exposed shot at 200 cm and an over-exposed shot at 10 cm. Several measurements of the same object were performed successively throughout one scanning cycle and a desk calculator connected to the system printed out the percent of density, the statistical error of the measurement and the number of separate particles counted.

At short shooting ranges, the total density greatly deviates from the linear relationship between the activity and the autoradiographic density as a consequence of overexposure. The curves of the three parameters obtained analytically, i.e., activity measurement, total density and number of particles, are characteristic of the combination of weapon and ammunition and may be used to determine the range.

Visual Intercomparison Method

The ability of the human eye to classify two-dimensional differences in particle number, particle size, density and distribution offers a number of advantages relative to the photometric method of measurement so far used in comparing unknown samples with a reference series. The human assessment of errors committed by the measuring equipment will be explained by two examples. Activity measurement and the measurement of total density produce the same result, irrespective of whether this concerns a few large points of antimony-124 or a multitude of small points. However, 3,932,748

METHOD OF DETERMINING THE DISTANCE BETWEEN AREA UNDER FIRE AND THE MUZZLE OF THE WEAPON

BACKGROUND OF THE INVENTION

The present invention relates to a method of determining the distance between an area under fire and the muzzle of the weapon by means of autoradiography of the irradiated firing residues on this area.

Determining the distance between a fire arm and the point of impact is a very important problem in criminal investigation. In doubtful cases of suicide, justifiable self-defense, or even when determining whether a specific hole was caused by the impact of a bullet, the immediate environment of the point of impact is a very important source to be investigated.

A large number of methods of identification of traces of shots are known; but, so far neither chemical analysis nor purely quantitative determination through neutron activation analysis (NAA) permit a satisfactory assessment of the distance to be made. Among other disadvantages, these methods do not operate in the non-destructive mode because the irradiated filters with the traces of shots had to be destroyed for measurement so that the spurious activity of the matrix was removed.

Autoradiography has already been used to identify impacts of bullets as such by irradiating a piece of material fired at and afterwards contacting it with X-ray film. This film was then processed into prints or radiographs, respectively. However, this type of investigation of the hole made by a bullet does not allow any conclusions to be drawn as to the range from which a shot was fired.

SUMMARY OF THE INVENTION

The method according to the present invention in a general sense relates to the detection of the traces of antimony following the bullet and ejected by the weapon. These are always contained in the primer or in the bullet in addition to barium and lead. These particles accumulate on the material stopping a bullet as the bullet penetrates, and are retained and partly burned into this area. The characteristic distribution of such particles in the area around a bullet hole is unambiguous and cannot be placed there in any other way.

As has been shown in qualitative analyses of the bullet, powder, primer and shell, the main source of the traces of antimony is the bullet, some of it stemming from the powder as well as the primer. Most probably a certain quantity is rubbed off the bullet as the bullet very rapidly passes the rifling on the inside of the barrel, follows the bullet as a powder or in molten form and is precipitated around the point of impact. As far as the analysis of traces at the point of impact is concerned, it is a particularly fortunate coincidence that the element antimony is very easy to ascertain after neutron activation.

The present invention is concerned with a non-destructive and thus reproducible method which can be used to determine the distance between the point of impact of a bullet and a weapon. The structure of the background at which the bullet was fired should not be able to falsify the result, and the evaluation should be very simple and quick.

In the present invention, this problem is solved in the method outlined above in that several carrier areas are fired at from various distances. The carrier areas afterwards are activated by neutron irradiation and then contacted with a film sensitive to nuclear radiation. The series of autoradiographs produced after development of the film are compared with the autoradiograph produced in the same way of the trace on the area under fire of the shot to be investigated and are used as a distance standard for that trace. In this method the carrier areas may be made out of the same material as the area under fire. For the case of a highly radioactive carrier area containing, for instance, antimony, it is suggested in accordance with the present invention that the residues of the shot after irradiation are transferred from the carrier areas and/or the area under fire onto a new carrier which is then used to produce the autoradiographs. In accordance with the present invention a very advantageous method of transfer is contacting the area containing the residues of the shot with an adhesive foil under pressure, afterwards separating the area and the foil from each other and covering the adhesive side of the foil with another foil. It is furthermore suggested in the present invention that the total density and the number of particles be measured either visually or by means of image analyzers in evaluating the autoradiographs as the distance standard.

DESCRIPTION OF THE PREFERRED EMBODIMENTS

Figure 2:
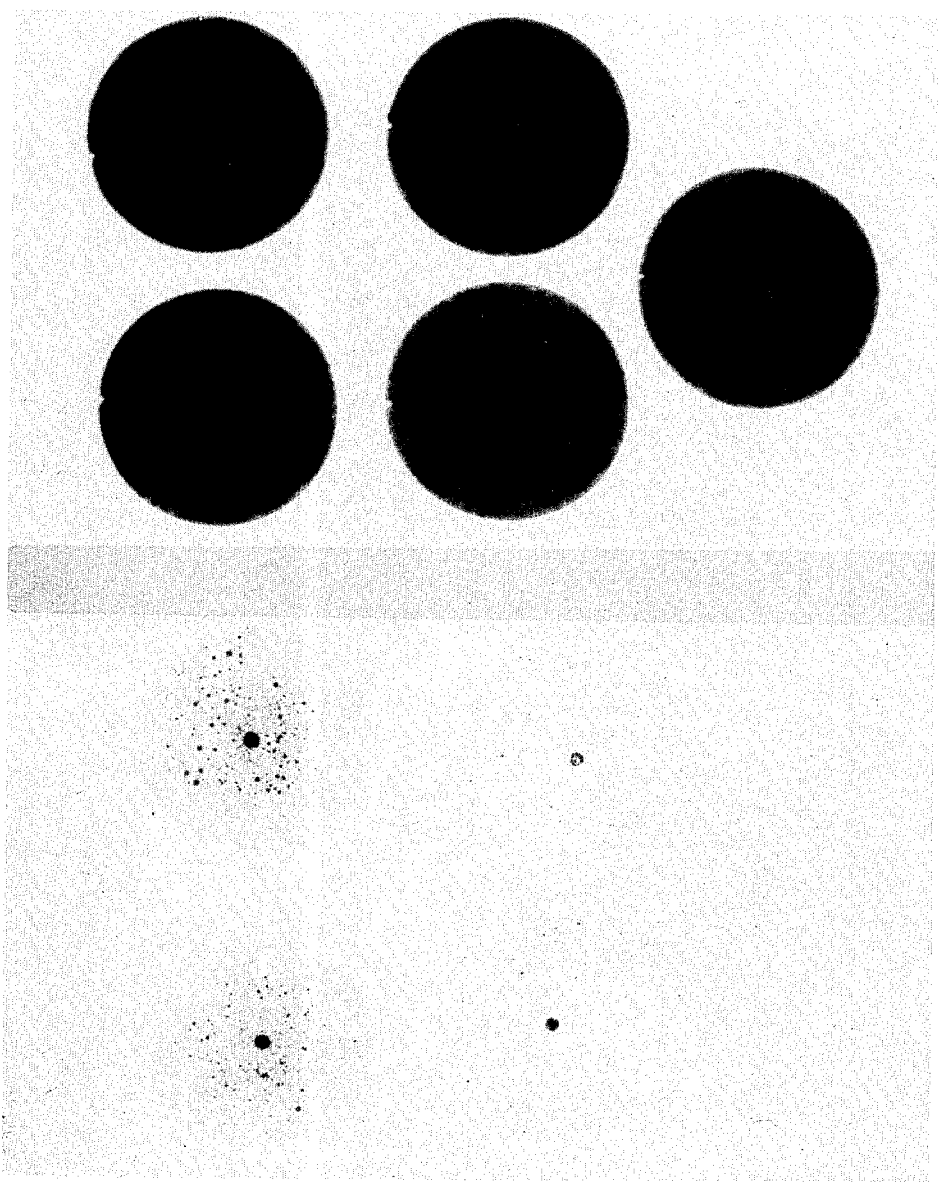
FIG. 2 shows the radiographs of shots fired at cotton areas, on the right-hand side a photograph of the area in which the bullet was stopped, on the left-hand side the photograph of the traces transferred by means of the stripping technique to a new area and foil, respectively.

The distances are 2 × 100 and 50 cm, respectively, and one control sample of the material not fired at. FIG. 2 very clearly shows the influence of cotton and the radiating background, respectively, and also the identity of traces of the shot after transfer to another foil and area, respectively, by the new stripping technique that is the method by which the firing traces are transferred from the object being tested to another carrier.

Figure 1:
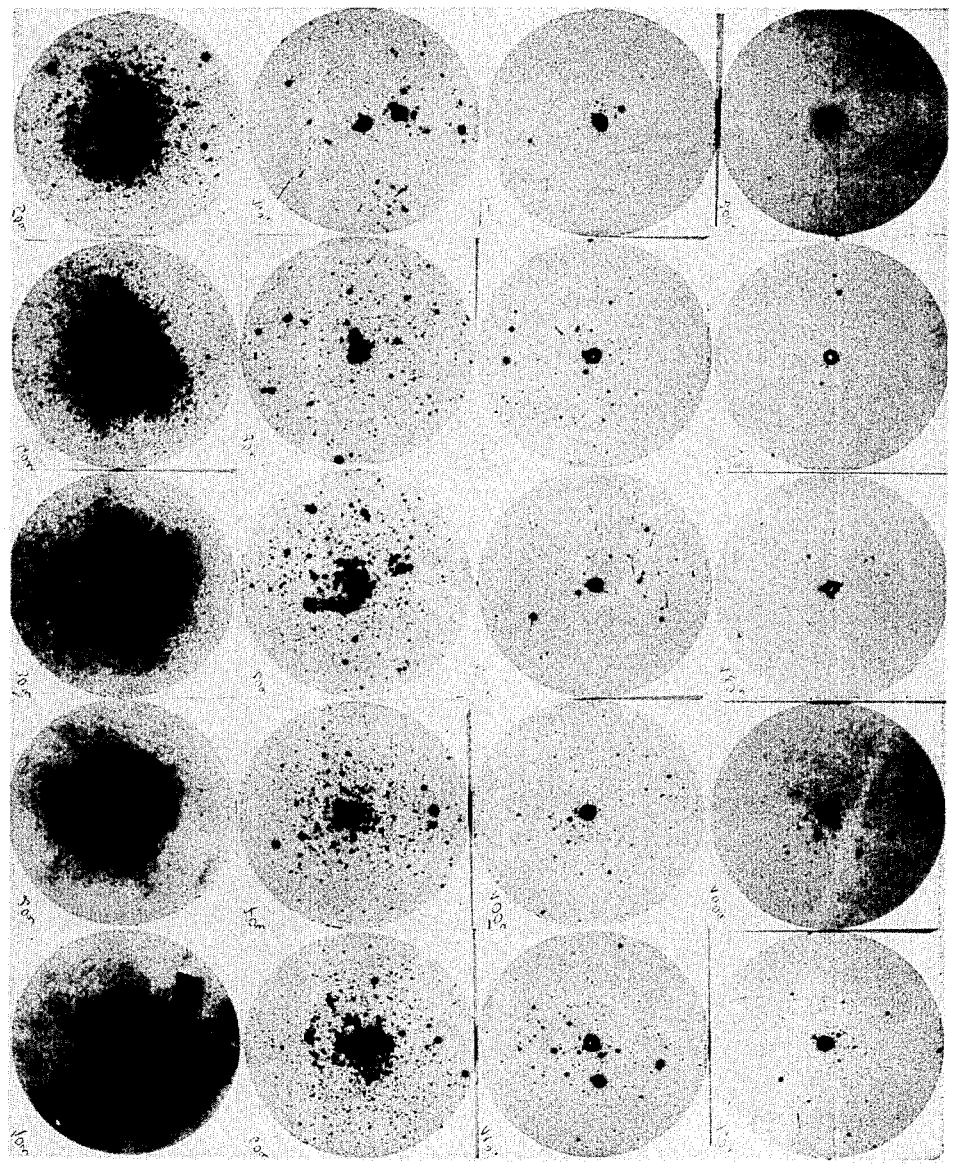
FIG. 1 shows the radiographs of several carrier areas made of filter paper, fired at from a distance of 10 to 200 cm (upper left to bottom right), an unsheathed lead bullet.

Now the series according to FIGS. 1 and 2 are compared with the radiograph of the shot to be determined, the assignment to a specific shooting range being made either visually or by other methods of evaluation. It can be shown by means of the photographs that the precipitates were mainly two types of particles. The coarse particles leave the muzzle independently together with the bullet and are characterized by a rapidly decreasing precipitation density on the impact area and a large amount of scatter. In addition, the bullet wave carries along small particles of the primer which have a much longer range. Both the size of particles and their range turn out to be important characteristics of the combination of weapon and ammunition. Making the traces of the shot around the bullet hole visible by means of autoradiography greatly aids the quantitative determination of these traces, prevents wrong analytical conclusions due to contamination, and operates practically non-destructively.

visual observation of the autoradiographs shows a clear ditinction between the two shooting distances. Also contamination of the reference samples by fingerprints of the person who had held the weapon or the powder smoke obviously produces wrong results in a measurement of only density and activity.

If a self-contained reference series of the type suggested by the present invention is available, it is relatively easy for the human observer to classify the unknown sample correctly. In a combination of weapon and ammunition the assignment of an unknown firing sample up to a range of 1.20 m is possible with an accuracy of ± 10 cm. This makes the method according to the present invention a very important means of avoiding errors in the evaluation of analytical results of measurements performed to determine shooting ranges.

One important advantage of the method according to the present invention is the simplicity of the method and its economy. While activity counts require the purchase of a multi-channel semi-conductor measuring setup or radiochemical operations to separate the matrix and the firing residue, the method suggested according to the present invention merely requires a darkroom, which will often be available anyway, which can easily be converted for work on low level radioactivities.

In summary, the present invention shows a method of determining the shooting range, not only by the quantitative determination of antimony from the firing residue but also by making visible the traces of the shot around the point of impact. For a given combination of ammunition and weapon this results in characteristic distributions from which the shooting range can be determined in an advantageous way even by visual comparison. The new stripping technique suggested allows a separation of the carrier from the firing trace to be made without falsifiyng the characteristic distribution. This technique is particularly important and very advantageous if the carrier material of the firing trace shows strong activity of the matrix. The method suggested in accordance with the present invention works non-destructively, i.e., the firing sample is retained as evidence. Besides the advantages mentioned above it is also possible to produce a catalog of firing traces of various weapons and different types of ammunition by means of which unknown firing traces can be measured even more quickly and simply. In addition, the stripping technique can be performed also in advance on non-activated areas. The next steps will remain unchanged.

What we claim is:

1. A method of determining the distance between an area under fire and the muzzle of the weapon by means of autoradiography of the irradiated firing residues on this area, comprising (a) firing at several carrier areas from various distances, (b) subsequently activating the carrier areas by neutron irradiation, (c) subsequently contacting the carrier areas with a film sensitive to nuclear radiation, (d) developing the film, (e) preparing an autoradiograph of a firing trace to be investigated by following steps (b) through (d), (f) comparing the series of autoradiographs produced after development on the film with the autoradiograph produced of the firing trace to be investigated.

2. Method as claimed in claim 1, wherein the carrier areas are made of the same material as the area under fire.

3. Method as claimed in claim 1, wherein the firing residues are transmitted from the carrier areas and the area under fire after activation onto to a new carrier from which the autoradiographs are made.

4. Method as claimed in claim 3, wherein the area with the firing residues is contacted with an adhesive foil under pressure, subsequently area and foil are separated from each other and the adhesive side of the foil is covered with another foil.

5. Method as claimed in claim 4, wherein the distance standard used for evaluation of the autoradiographs is the total density measured together with the number of particles by means of image analyzers.

* * * * *